May 31, 1960     G. L. FERNSLER     2,939,142
BENDING MICROWAVES BY MEANS OF A MAGNETIC OR ELECTRIC FIELD
Filed July 23, 1958
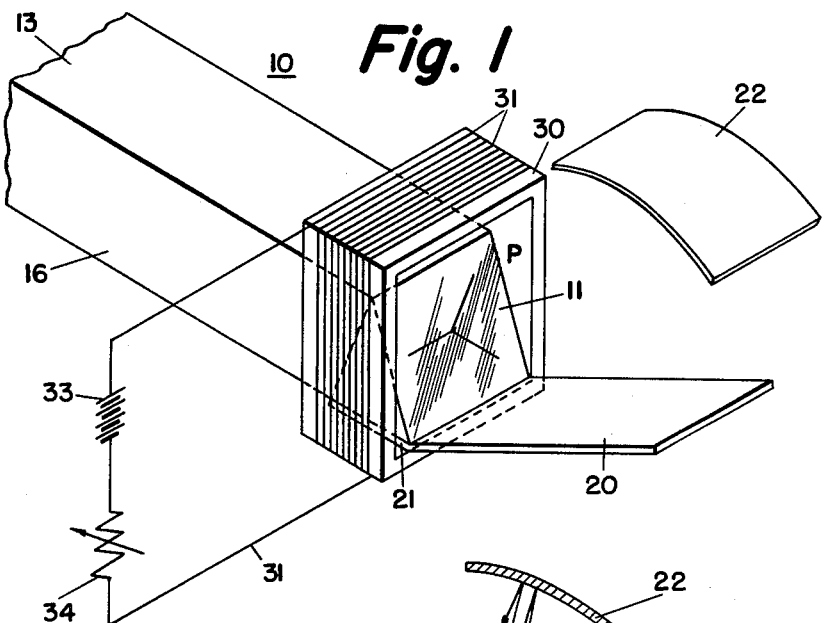
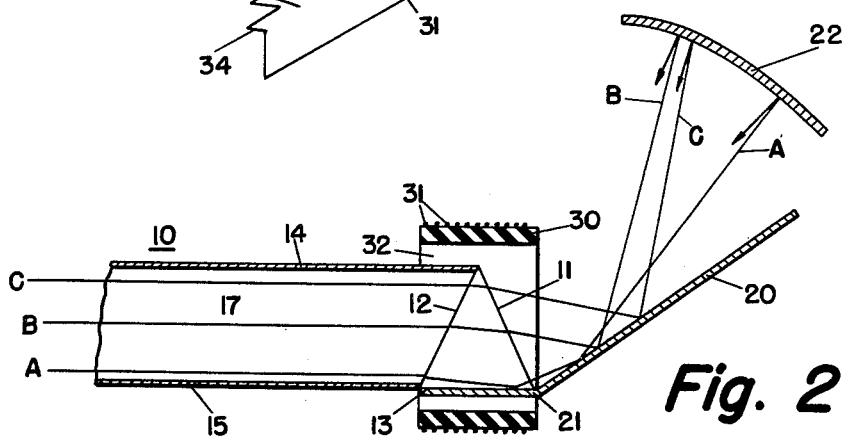
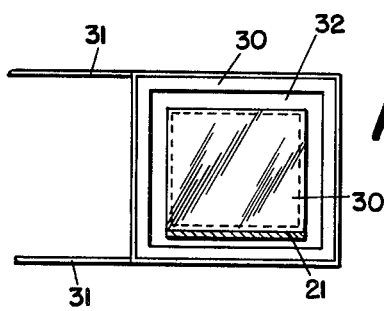
INVENTOR.
GEORGE L. FERNSLER
BY
ATTORNEY

United States Patent Office 2,939,142
Patented May 31, 1960

2,939,142

BENDING MICROWAVES BY MEANS OF A MAGNETIC OR ELECTRIC FIELD

George L. Fernsler, Norristown, Pa., assignor, by mesne assignments, to the United States of America as represented by the Secretary of the Navy Filed July 23, 1958, Ser. No. 750,546

4 Claims. (Cl. 343—754)

This invention relates to a radar scanning system and more particularly to electromagnetic means for sweeping radar beams over a sector of the surrounding terrain to be scanned.

The proper operation of any radar system depends in a fundamental way on the antenna. It is customary in radar systems to use mechanical controls for operating the antenna, for operating the dials which indicate the antenna position, and for rotating the deflection coil of plan-position indicators in correspondence with the antenna. The antenna is connected by gears to the shaft of a synchro-generator and voltages from the generator are transmitted to a synchro-motor to operate in correspondence with the generator motion. Thus the deflection coil geared to the synchro-motor is made to follow the antenna motion, and the direction of the range trace on the indicator tube corresponds to the direction of radiation from the antenna. Proper maintenance and successful operation of such synchro or servomechanism systems offer a frequent source of annoyance in radar operation.

It is the broad object of this invention to provide a device or system which reduces these difficulties of operation by electromagnetically scanning over a selected portion of terrain without necessitating the use of moving mechanical elements.

Another object is to provide a waveguide or compartment which is adapted for use in an electromagnetic scanning system.

A more specific object is to provide a waveguide with an electromagnetic field for use in a radar scanning system. For a better understanding of the invention reference may be made to the drawings wherein:

Fig. 1 is a perspective view of the scanning system or device with means for energizing and controlling electromagnetic fields shown schematically;

Fig. 2 is generally a sectional side-elevational view of Fig. 1; and

Fig. 3 is an end view of Fig. 1 with portions removed.

Referring now to Fig. 1, there is shown a metallic rectangular transmitting compartment 10 which functions as a waveguide and may, for example, be transmitting in the $TE_{01}$ modes. A ferrite prism P, having an emerging surface 11, an incident surface 12, and base 13, is preferably composed of iron oxide, magnesium oxide and manganese oxide. As shown in prism P should take the form of an isosceles and be mounted adjacent the outlet end of the wave compartment 10 to interrupt and refract all waves transmitted through the wave compartment. The outlet portion of compartment 10 is shaped to accommodate incident surface 12 of the prism as is clearly shown in Fig. 2. To this end the upper wall 14 of compartment 10 overhangs its bottom wall 15 by a distance or space which is approximately equal to ½ the width of base 15 of prism P and consequently the sidewalls 16 and 17 of the compartment are constructed to snugly receive the incident surface 12 of the prism while the lower wall 15 and base 13 are coplanar all as is shown in Fig. 2.

A metal horn radiator, has an outer portion which provides one reflecting surface 20 and an inner portion 21 which mates and is fixed to base 13 of prism P and provides another reflecting surface. A directional reflector or antenna 22 is positioned above the horn radiator and as shown in Fig. 1 is of the parabolic cylinder type, although directional reflectors of other shapes may be used advantageously with this invention. The horn radiator has its outer portion 20 bent at an angle upwardly in cooperating reflecting position with the directional reflector 22 while its inner portion 21 prevents waves from escaping from the prism base 13 by deflecting waves back into the prism and to the portion 20 of the horn radiator. All waves therefore passing through waveguide 10 necessarily pass through the prism and are ultimately deflected by the reflector 22.

Surrounding the prism P and portions of waveguide or compartment 10 is a soft iron core 30 which is shown as rectangular but may take other symmetrical shapes having a long and a short axis. A coil 31 is wound about the core and lengthwise thereof and an air space 32 is provided between the core and coil assembly and the prism to provide insulation therebetween.

The coil 31 is energized by a suitable source of electric power which may, as shown, be a battery 33 and the applied magnetic field surrounding the coil is controlled by variable resistor 34 which is serially connected with the battery.

In Fig. 2 typical paths of three waves are shown, no external magnetic field being applied. Wave A shown as traversing the lower portion of the waveguide or compartment 10 is incident on surface 12 of prism P and is refracted downwardly toward base 13 of the prism and would pass therethrough were it not for the inner portion 21 of the horn radiator.

The wave is deflected back into the prism and passes through the emerging surface 11 of prism P to the outer portion 20 of the horn radiator and is then deflected toward reflector 22. Waves B and C, traversing the central and upper portions respectively of waveguide or compartment 10 are incident on surface 12 and pass through the emerging surface 11 to the outer portion 20 of the horn radiator and are then deflected to the reflector 22.

By way of further explanation, consider the transmitted waves, A, B, and C to be of the $TE_{01}$ type. When waves contact prism P, they will be refracted in accordance with optical refraction laws, the amount of refraction depending upon the velocity changes of the waves upon leaving compartment 10, entering, passing through, and leaving the prism P. Hence, the amount of refraction through a ferrite prism can be controlled if the wave velocity changes can be controlled. Velocity, v, in passing through a prism is expressed by the formula $$v = \frac{1}{\mu \epsilon}$$

where $\mu$ is the permeability of the ferrite and $\epsilon$ its effective dielectric constant.

If a magnetic field is applied to prism P in a direction perpendicular to the direction of propagation of the wave, as in the manner herein disclosed, the permeability of the ferrite prism will vary in accordance with the strength of the applied magnetic field. Similarly, the effective dielectric constant for ferritic materials depends on the polarization of its atoms under the influence of the same applied magnetic field. And since both permeability and effective dielectric constant can be varied by changing the strength of the applied magnetic field, the amount of refraction of any waves in passing through the prism are easily controlled.

Therefore, since any wave in leaving emerging surface 12 of prism P can be controlled in accordance with the strength of the applied magnetic field surrounding the prism, the wave being radiated from the horn radiator and deflected from the reflector, scanning of radar beams by electromagnetic means over a selected portion of the surrounding terrain without the use of moving mechanical elements may be effected.

It is understood that other arrangements and materials within the spirit and scope of the invention will be readily obvious to those skilled in the art and it is desired that the appended claims be accorded the broadest construction consistent with their language.

What is claimed is:

1. A radar scanning system comprising a wave compartment for the passage of electro-magnetic energy waves, a prism disposed adjacent the compartment outlet, said prism having its incidence face enclosed by the compartment walls and positioned for refracting all energy waves passing through the compartment and its emergence face positioned exteriorly of the compartment, means supporting the base of the prism for preventing passage of refracted waves therethrough and directing them for passage through the emergence face, radiating means extending from the prism base at an angle opposed to the angle of the emergence face to interrupt and deflect upwardly the waves passing through the emergence face and antenna means positioned to receive the deflected waves.

2. Apparatus as in claim 1 further characterized by said means supporting the base of the prism and the radiating means being formed integrally.

3. A radar scanning system comprising a wave compartment for the passage of electro-magnetic energy waves, a prism disposed adjacent the compartment outlet, said prism having its incidence face enclosed by the compartment walls and positioned for refracting all energy waves passing through the compartment and its emergence face positioned exteriorly of the compartment, means supporting the base of the prism for preventing passage of refracted waves therethrough and directing them for passage through the emergence face, radiating means extending from the prism base at an angle opposed to the angle of the emergence face to interrupt and deflect upwardly the waves passing through the emergence face, antenna means positioned to receive the deflected waves, electro-magnetic field means surrounding the outlet end of the compartment and means for controlling said field means for varying the refractive effects of the prism.

4. Apparatus as in claim 3 further characterized by said prism being a semiconductor formed of a ferromagnetic material.

References Cited in the file of this patent

UNITED STATES PATENTS

| | | |
|---|---|---|
| 2,840,820 | Southworth | June 24, 1958 |
| 2,869,124 | Marie | Jan. 13, 1959 |

FOREIGN PATENTS

| | | |
|---|---|---|
| 1,052,353 | France | Jan. 25, 1954 |